United States Patent
Ejiri et al.

(10) Patent No.: US 7,182,464 B2
(45) Date of Patent: *Feb. 27, 2007

(12) United States Patent

(54) PROJECTOR WITH ADJUSTABLY POSITIONED IMAGE PLATE

(75) Inventors: Koichi Ejiri, Tokyo (JP); Takao Yamaguchi, Tokyo (JP); Shin Aoki, Tokyo (JP); Haike Guan, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/981,804

(22) Filed: Nov. 5, 2004

(65) Prior Publication Data

US 2005/0062940 A1    Mar. 24, 2005

Related U.S. Application Data

(60) Division of application No. 10/423,442, filed on Apr. 25, 2003, now Pat. No. 6,830,341, which is a continuation of application No. 10/055,222, filed on Jan. 22, 2002, now Pat. No. 6,609,797, which is a continuation of application No. 09/493,334, filed on Jan. 28, 2000, now Pat. No. 6,361,171.

(30) Foreign Application Priority Data

Jan. 29, 2000  (JP) .................................. 11-022916

(51) Int. Cl.
*G03B 21/00* (2006.01)
*G03B 21/14* (2006.01)

(52) U.S. Cl. ........................... 353/69; 353/70; 353/121

(58) Field of Classification Search ................. 353/30, 353/31, 69, 70, 88, 121; 349/5, 6, 7, 58; 359/242; 348/745, 746, 747, 761, 766, 771, 348/806, 586; 396/115, 149, 150, 430; 600/118; 714/752
See application file for complete search history.

(56) References Cited

U.S. PATENT DOCUMENTS

| | | | | | |
|---|---|---|---|---|---|
| 6,058,498 | A | * | 5/2000 | Nagasaki et al. | 714/752 |
| 6,063,023 | A | * | 5/2000 | Sakiyama et al. | 600/118 |
| 6,361,171 | B1 | * | 3/2002 | Ejiri et al. | 353/69 |
| 6,609,797 | B2 | * | 8/2003 | Ejiri et al. | 353/69 |
| 6,674,485 | B2 | * | 1/2004 | Akiyama et al. | 348/586 |
| 6,686,973 | B2 | * | 2/2004 | Su | 348/745 |
| 6,830,341 | B2 | * | 12/2004 | Ejiri et al. | 353/69 |

FOREIGN PATENT DOCUMENTS

| | | |
|---|---|---|
| JP | 6-189236 | 7/1994 |
| JP | 7-270748 | 10/1995 |

* cited by examiner

*Primary Examiner*—Melissa J Koval
(74) *Attorney, Agent, or Firm*—Knoble Yoshida Dunleavy, LLC

(57) ABSTRACT

A project is often positioned so that its optical axis is at an imperfect orthogonal angle with respect to a projection screen. This position causes a keystone distortion as well as imperfect focus in the projected image. To correct these undesirable problems, initially, a lens and/or an image-forming plate is independently repositioned to bring the projected image into focus based upon user input data. The keystone distortion is also corrected by redrawing the image on an image-forming surface based upon additional user input data.

16 Claims, 15 Drawing Sheets

FIG. 4

| A POINT ON IMAGE PLATE PLANE | A POINT ON PROJECTED SURFACE |
|---|---|
| $(X, Y)$ | $\left( \dfrac{cX}{1-pX-qY}, \dfrac{cY}{1-pX-qY}, \dfrac{c}{1-pX-qY} \right)$ |

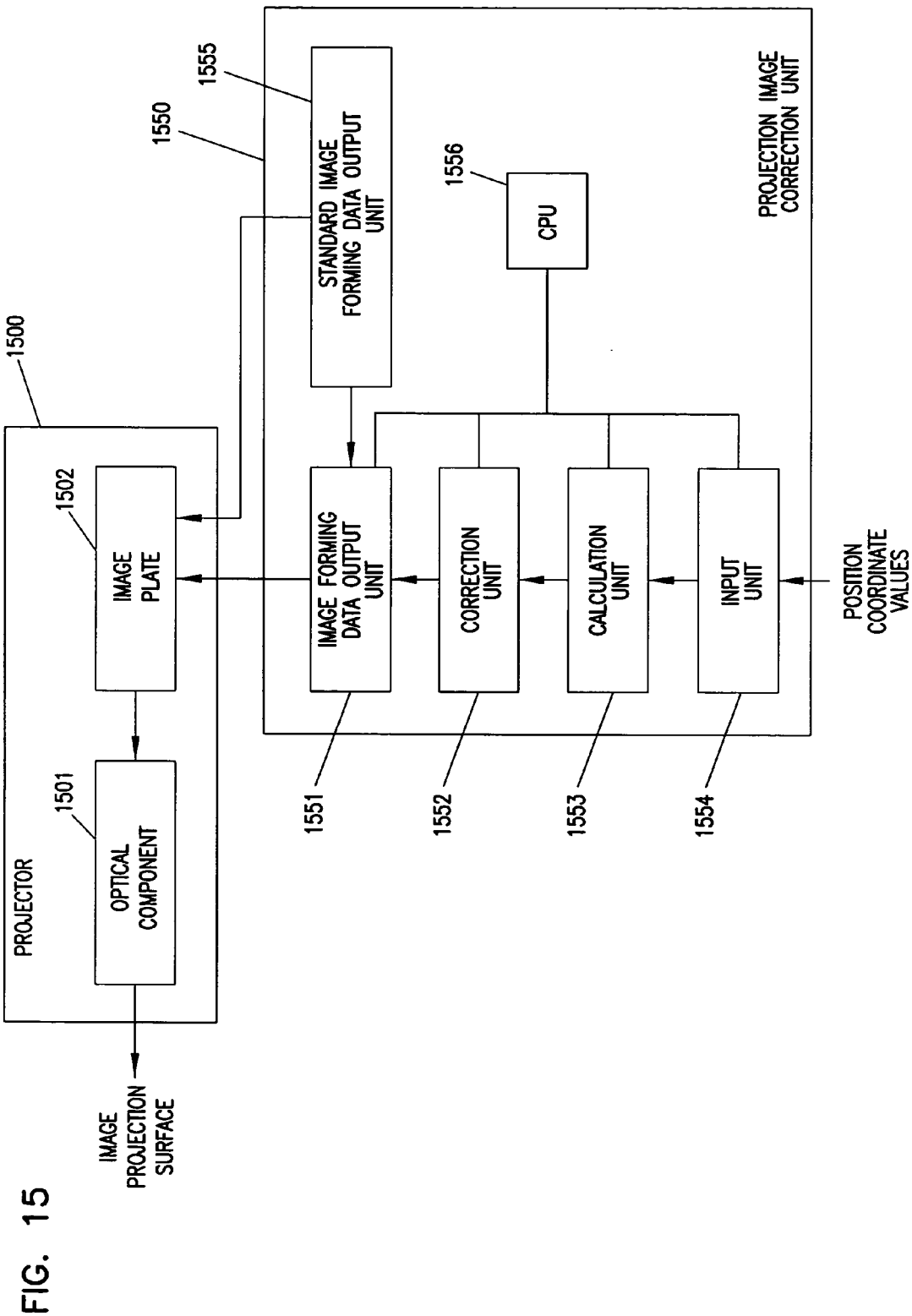

PROJECTOR WITH ADJUSTABLY POSITIONED IMAGE PLATE

This is a divisional of prior application Ser. No. 10/423,442 filed on Apr. 25, 2003 now U.S. Pat. No. 6,830,341 which is a continuation of prior application Ser. No. 10/055,222 filed on Jan. 22, 2002 now U.S. Pat. No. 6,609,797 which is a continuation of Ser. No. 09/493,334 filed on Jan. 28, 2000 now U.S. Pat. No. 6,361,171 under 35 C.F.R. 1.53(b)

FIELD OF THE INVENTION

The current invention is generally related to image projectors or image projection methods, and more particularly related to a correction of the projected image when the optical axis of a projector is positioned at a non-perpendicular angle with respect to an image-projection surface.

BACKGROUND OF THE INVENTION

It is an important issue for screen projectors to project a digitally formed image on a projection surface without any distortion. In prior art, a frequent problem for using a screen projector is a keystone distortion associated with an imperfectly orthogonal angle between the projection screen surface and an optical axis of the projector. In other words, the project is often positioned at an angle that is not perpendicular to the screen. In order to correct the keystone distortion, the following prior art approaches have been proposed. A typical prior art correction technique repositions the optical system or the projector itself. In this technique, a lens is re-positioned to be in parallel with the image-forming plane, and this technique has been embodied in a number of practical examples. Unfortunately, this technique requires a costly precision lens since an image is formed on a wide-angle side. A second technique is to correct the distortion by adding a wedge-shaped lens and prism in the optical system. The second technique also requires additional optical parts, and consequently, the system is costly for correcting a large amount of distortion.

Another prior attempt digitally corrects the keystone distortion in projected images. A typical correction involves the projection of a known test pattern in a fixed projection environment, and a digital camera takes an image of the projected pattern. Based upon the captured image, an amount of the distortion is calculated. An image-forming source is positioned to compensate the distortion amount. Unfortunately, this prior solution requires a separate image-capturing device such as a digital camera.

In view of the above-described prior art, it remains desirable to provide a projector that is equipped with an adjustable correction mechanism for a user to easily correct distortions, which are caused by the conditions under use and are different from expected distortions at the design stage.

SUMMARY OF THE INVENTION

In order to solve the above and other problems, according to a first aspect of the current invention a method of projecting an image to form a projected on an image-projection surface via an optical component, including the steps of: moving a point with respect to the projected image to a desired position on the image-projection surface at least one time to specify an area; converting coordinates of the projected image so as to generate a converted image to be projected in the specified area; and projecting the converted image onto the image-projection surface.

According to a second aspect of the current invention, a projector system for projecting an image, including: a projection unit for projecting an image to form a projected image on an image-projection surface via an optical component; a pointing unit for moving a point with respect to the projected image to a desired position on the image-projection surface at least one time to specify an area; and a conversion unit communicating with the pointing unit and the projecting unit for converting coordinates of the projected image so as to generate a converted image to be projected in the specified area, wherein the projection unit projecting the converted image onto the image-projection surface.

According to a third aspect of the current invention, an information processing apparatus communicating with a projector that projects an image onto an image projection surface via an optical component, including: a pointing unit for moving a point with respect to the projected image having distortion to a desired position on the image-projection surface at least one time to specify an area; and a conversion unit communicating with the pointing unit for converting coordinates of the distorted projected image so as to project in the specified area on the image-projection surface.

According to a fourth aspect of the current invention, a projector for projecting an image, including: a projection unit for projecting an image in a first area specified by a set of plural coordinates on an image-projection surface; an input unit for receiving data for changing at least one of the plural coordinates on the image-projection surface to define a second area, the input unit further including a cursor projected onto the image-projection surface for specifying the data; and a conversion unit operatively connected to the input unit and the projection unit for converting the plural coordinates of the projected image so as to generate a converted image to be projected in the second area, wherein the projection unit projecting the converted image onto the image-projection surface in the second area.

According to a fifth aspect of the current invention, an information processing apparatus communicating with a projector for projecting an image in a first area specified by a plurality of coordinates on an image-projection surface via an optical component, including: an input unit for receiving data for changing at least one of the plural coordinates on the image-projection surface to define a second area, the input unit further including a cursor projected onto the image-projection surface for specifying the data; and a conversion unit operatively connected to the input unit for converting the plural coordinates of the projected image so as to generate a converted image to be projected in the second area, wherein the projector projecting the converted image onto the image-projection surface in the second area.

According to a sixth aspect of the current invention, a method of projecting an image having four corners to form a projected image on an image-projection surface having four corners via an optical component, including the steps of: selecting one corner of the projected image to correspond to one of the four corners of the image-projection surface; converting coordinates of the projected image based upon the selected corner so as to generate a converted image to be projected; projecting the converted image onto the image-projection surface;

moving one of the remaining three corners of the projected image to correspond to one of the three remaining corners of the image-projection surface; converting coordinates of the projected image so as to generate a converted image to be projected; projecting the converted image onto the image-projection surface; moving one of the remaining two corners of the projected image to correspond to one of the two remaining corners of the image-projection surface; converting coordinates of the projected image so as to generate a converted image to be projected; projecting the converted image onto the image-projection surface; moving the remaining corner of the projected image to correspond to the remaining corner of the image-projection surface; converting coordinates of the projected image so as to generate a converted image to be projected; and projecting the converted image onto the image-projection surface.

According to a seventh aspect of the current invention, a projector for projecting an image having four corners to form a projected image on an image-projection surface having four corners via an optical component, including: an input unit for selecting one corner of the projected image to correspond to one of the four corners of the image-projection surface; a conversion unit connected to the input unit for converting coordinates of the projected image based upon the selected corner so as to generate a converted image to be projected; and a projection unit connected to the conversion unit for projecting the converted image onto the image-projection surface, wherein the input unit also allows the user to move one of the remaining three corners of the projected image at a time to correspond to one of the three remaining corners of the image-projection surface and the projection unit subsequently projects the converted image onto the image-projection surface after each conversion.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 4 shows a relation between a point (X,Y) on an image-forming plate or surface and a point (x,y) on an image-projection surface.

FIG. 15 is a block diagram illustrating a third preferred embodiment of the image-correcting projector according to the current invention.

DETAILED DESCRIPTION OF THE PREFERRED EMBODIMENT(S)

Figure 1:
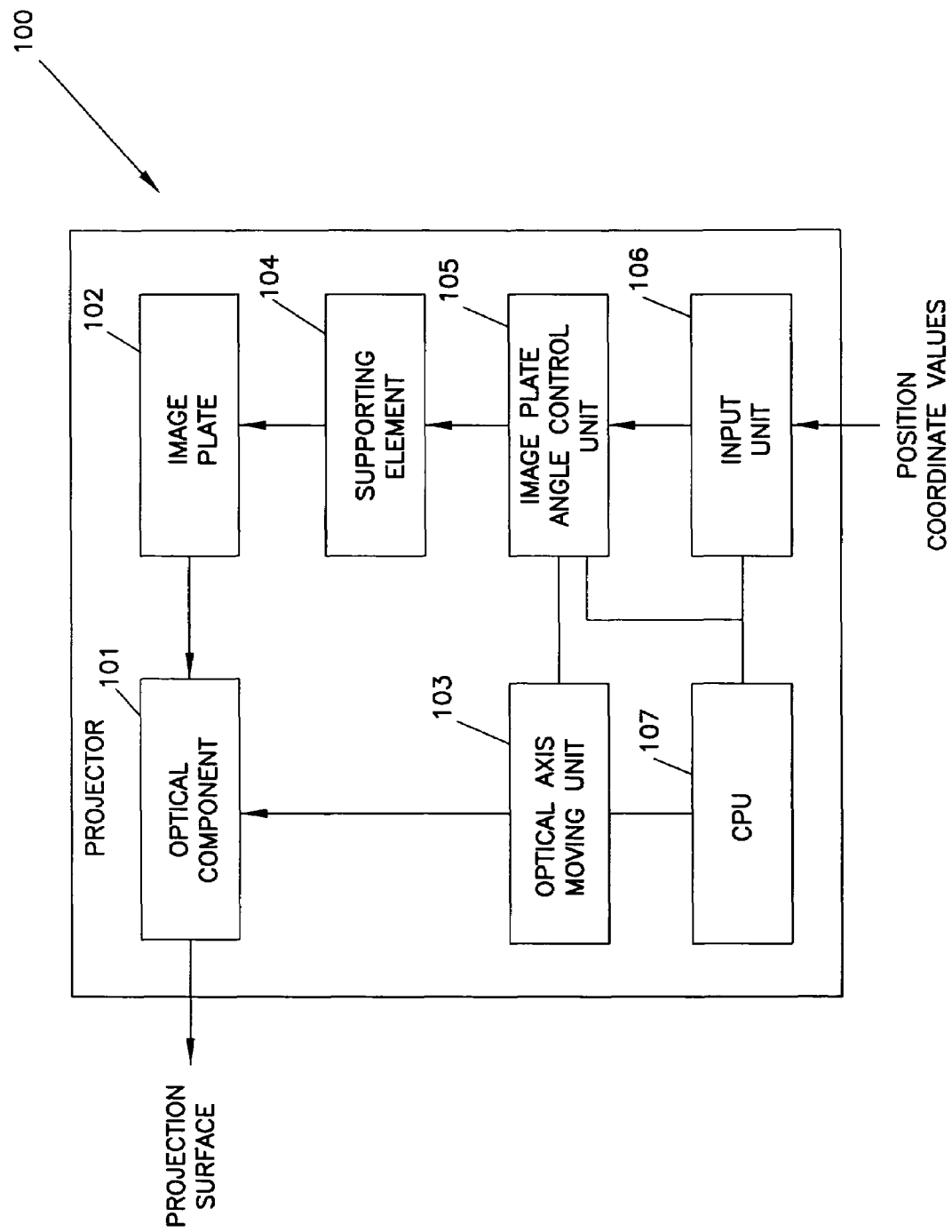
FIG. 1 illustrates one preferred embodiment of the projector according to the current invention.

Referring now to the drawings, wherein like reference numerals designate corresponding structure throughout the views, and referring in particular to FIG. 1, one preferred embodiment of the projector 100 according to the current invention includes an optical component 101, an image plate 102, an optical axis moving unit 103, a supporting element 104, an image plate angle control unit 105, an input unit 106 and a central processing unit (CPU) 107. The projector 100 projects an image onto a projection surface. The optical component 101 comprises a series of lenses for forming an image generated by the image plate 102 such as a liquid crystal display (LCD). The optical axis moving unit 103 moves the optical axis of the optical component 101 towards the center of the projection surface. The supporting element 104 supports the image plate 102 by at least two predetermined points, and the image plate angle control unit 105 controls the supporting element 104 so that the angle of the image plate 102 is adjusted with respect to the image projection surface. The input unit 106 inputs position coordinate values so that the focus of the image is adjustably corrected on the image projection surface. The CPU 104 runs a predetermined program to control the optical axis unit 103, the image plate angle control unit 105 and the input unit 106. The predetermined program is stored in media such as a hard disk, a floppy disk, read only memory (ROM) and random access memory (RAM). In an alternative embodiment of the projector 100, the optical axis of the optical component 101 is fixedly positioned, and the optical axis moving unit 103 is eliminated.

Figure 2:
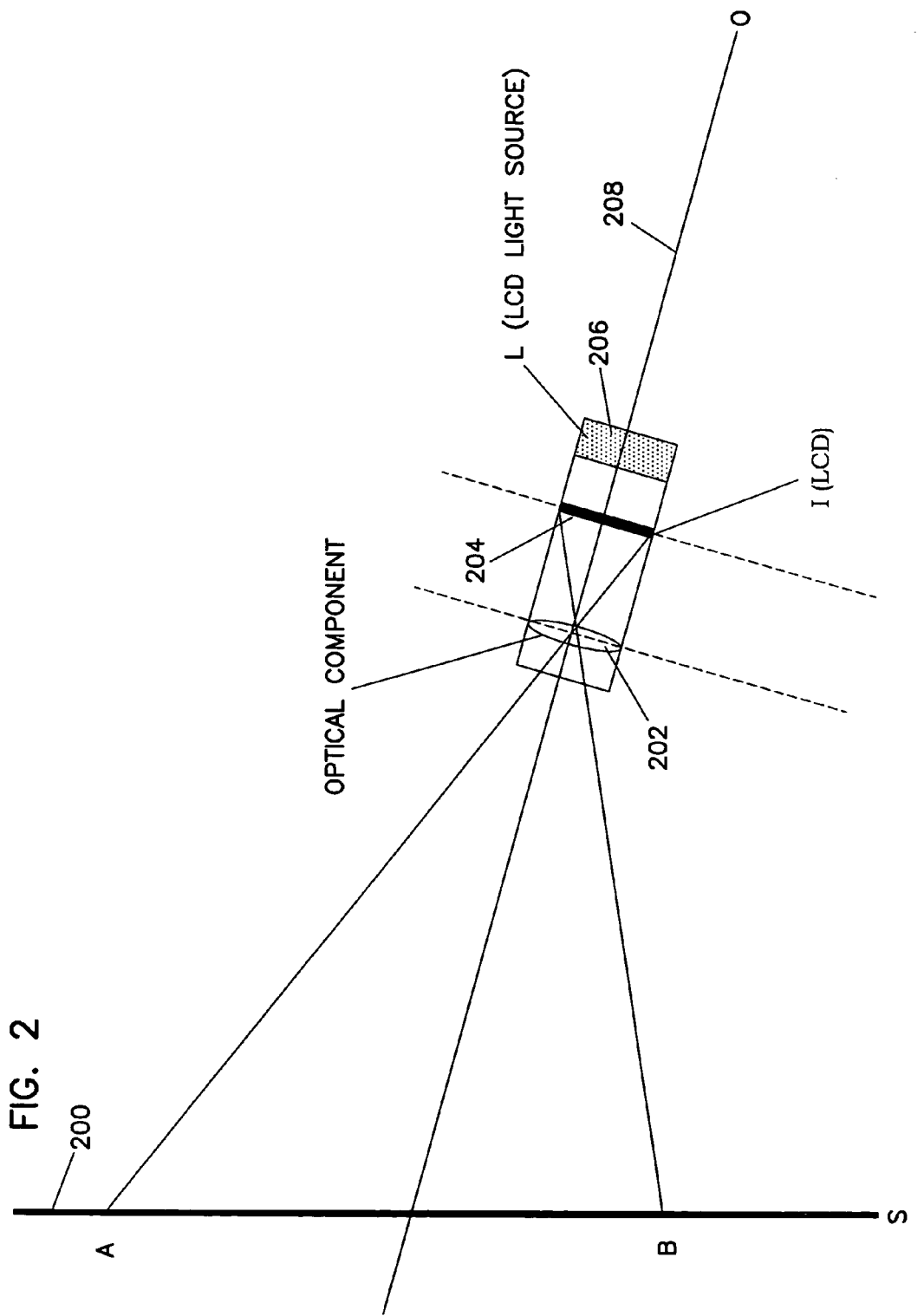
FIG. 2 is a cross-sectional view illustrating positional relationships among components in one preferred embodiment of the projector according to the current invention.

Now referring to FIG. 2, a cross-sectional view illustrates positional relationships among an image plate I 204, an optical component 202, an image projection surface 200 and a light source 206 in one preferred embodiment of the projector according to the current invention. The image plate I 204 projects via the optical component 202, an image on the projection surface 200 which extends from a point A at one end to a point B at the other end. The light source 206 is located behind the image plate I 204 for providing light. Since the vertical axis of the lens 202 and that of the image plate 204 as indicated by the dotted lines are at an angle with respect to the image projection surface 200, the image formed on the image projection surface 200 is not focused and has undesirable distortion. This relationship is also indicated by an angle formed by an optical axis 208 and the image projection surface 200. In other words, the optical axis 208 is at a non-perpendicular angle with respect to the image projection surface 200. To adjust the focus, the optical axis 208 of the optical component 202 is rotated by the optical axis moving unit 103 of the projector 100 as shown in FIG. 1. This focus mechanism replaces a prior optical component that requires a wide-angle lens and/or a prism. Despite the above rotation, it is not possible to bring both the point A and the point B into focus at the same time since these points have a different distance to the image plate I 204. The correction is made as will be described below.

Figure 3:
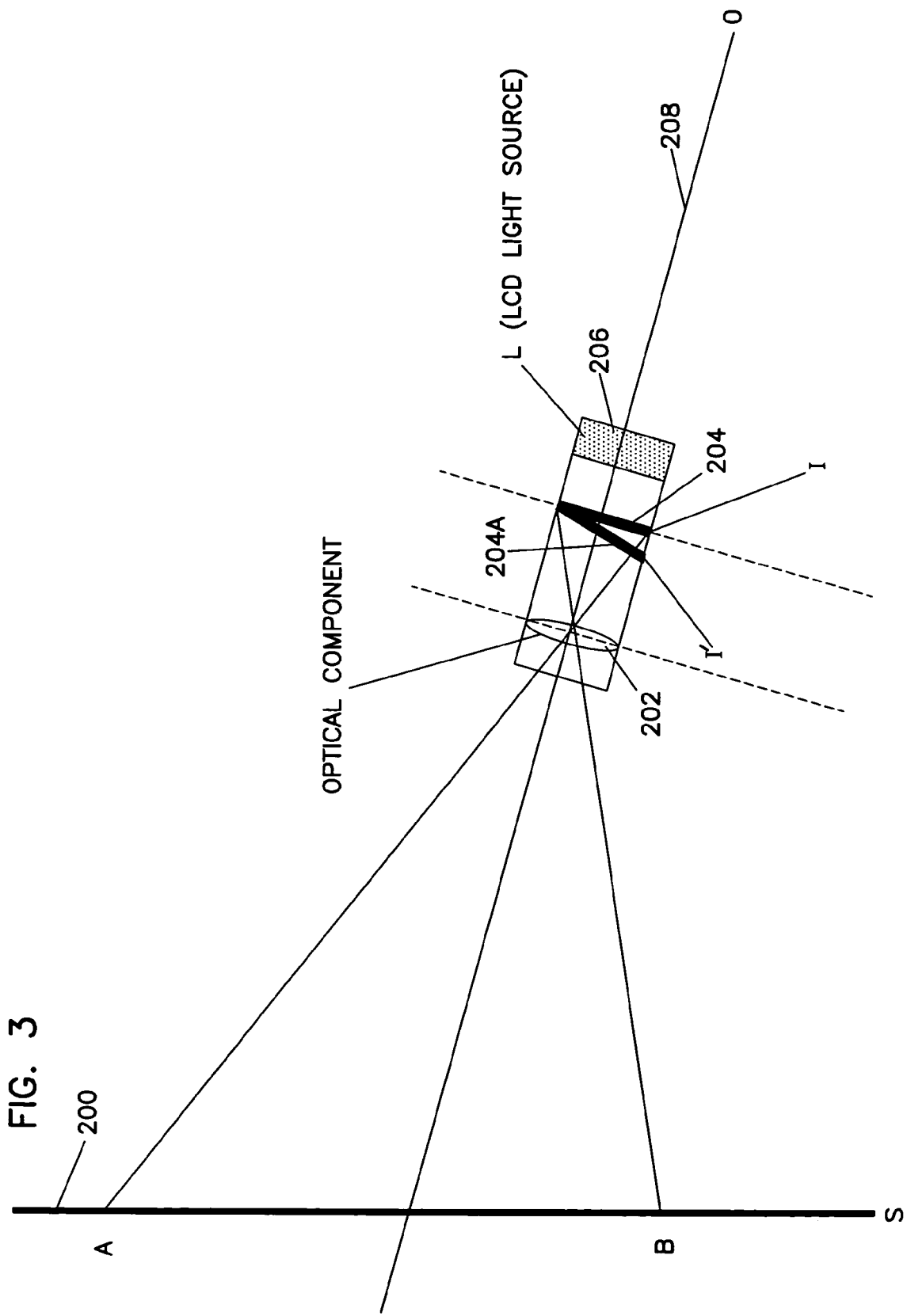
FIG. 3 is a cross-sectional view illustrating positional relationships among the components of the preferred embodiment of the projector according to the current invention after the image plate is moved to a new position.

Now referring to FIG. 3, a cross-sectional view illustrates positional relationships among the image plate I 204, the optical component 202, the image projection surface 200 and the light source 206 of the preferred embodiment of the projector according to the current invention after the image plate I 204 is moved to a new position. In order to simultaneously focus the points A and B of an image on the image projection surface 200, the image plate I 204 is moved. That is, an end of the image plate I 204 correspondingly forming a point A in the image is moved closer to the optical component 202 at a position 204 A while the other end of the image plate I 204 is fixedly positioned. The above description pertains to a general concept of correcting the image distortion according to the current invention.

To further illustrate the above concept of the image correction, equations are used. The image projection surface is expressed by the following equation (1):

$$z = px + qy + c \tag{1}$$

where the z axis is an optical axis of the optical component and is perpendicular to the image plate while the x axis and the y axis are both parallel to the image plate surface and are perpendicular with each other. The image plate is assumed to be positioned at z=1 between the optical component and the image projection surface. This assumption is often used in the area of the camera projection system.

The coordinate values on the image projection surface are expressed by (x,y) while those on the image plate are expressed by (X,Y). FIG. 4 shows a relation between a point (X,Y) and a point (x,y). That is, a point (X,Y) on the image plate is projected onto a point $$\left( \frac{cX}{1-px-qY}, \frac{cY}{1-pX-qY}, \frac{c}{1-px-qY} \right).$$

From the above relationship, equations (2), (3) and (4) are derived when X is zero, Y is zero and X and Y are zero.

$$(0,Y) \quad (0, -c/q, -c/q\, Y) \tag{2}$$

$$(X,0) \quad (-c/p, 0, -c/p\, X) \tag{3}$$

$$(0,0) \quad (0, 0, c) \tag{4}$$

The distance between (0,Y) and (X,0) on the image plate becomes the following distance on the image projection surface:

$$\frac{c}{q}\sqrt{1 + \frac{(qY+1)^2}{Y^2}} \cong \frac{c}{q}\sqrt{1 + \frac{1}{Y^2}} \tag{5}$$

Alternatively, the same distance on the image projection surface is expressed:

$$\frac{c}{p}\sqrt{1 + \frac{(pX+1)^2}{X^2}} \cong \frac{c}{p}\sqrt{1 + \frac{1}{X^2}} \tag{6}$$

Thus, then X=Y, the ratio of the distance is:

$$K = p/q \tag{7}$$

Since a unit of distance is the focal length of an image-forming lens, $$-1 < X, Y < 1 \tag{8}$$

$$-<<p, q<<1 \tag{9}$$

Equations (8) and (9) are held true. Furthermore, the horizontal and vertical axes on the image plate are also assumed to be on the same plane as those on the image projection plane. With the above assumptions, a coefficient of an equation expressing a screen is solved by measuring an equal line segment on the image projection surface in terms of the length on the image plate. In other words, a horizontal line and a vertical line of the same length are projected as lines having a ratio p:q.

Figure 5:
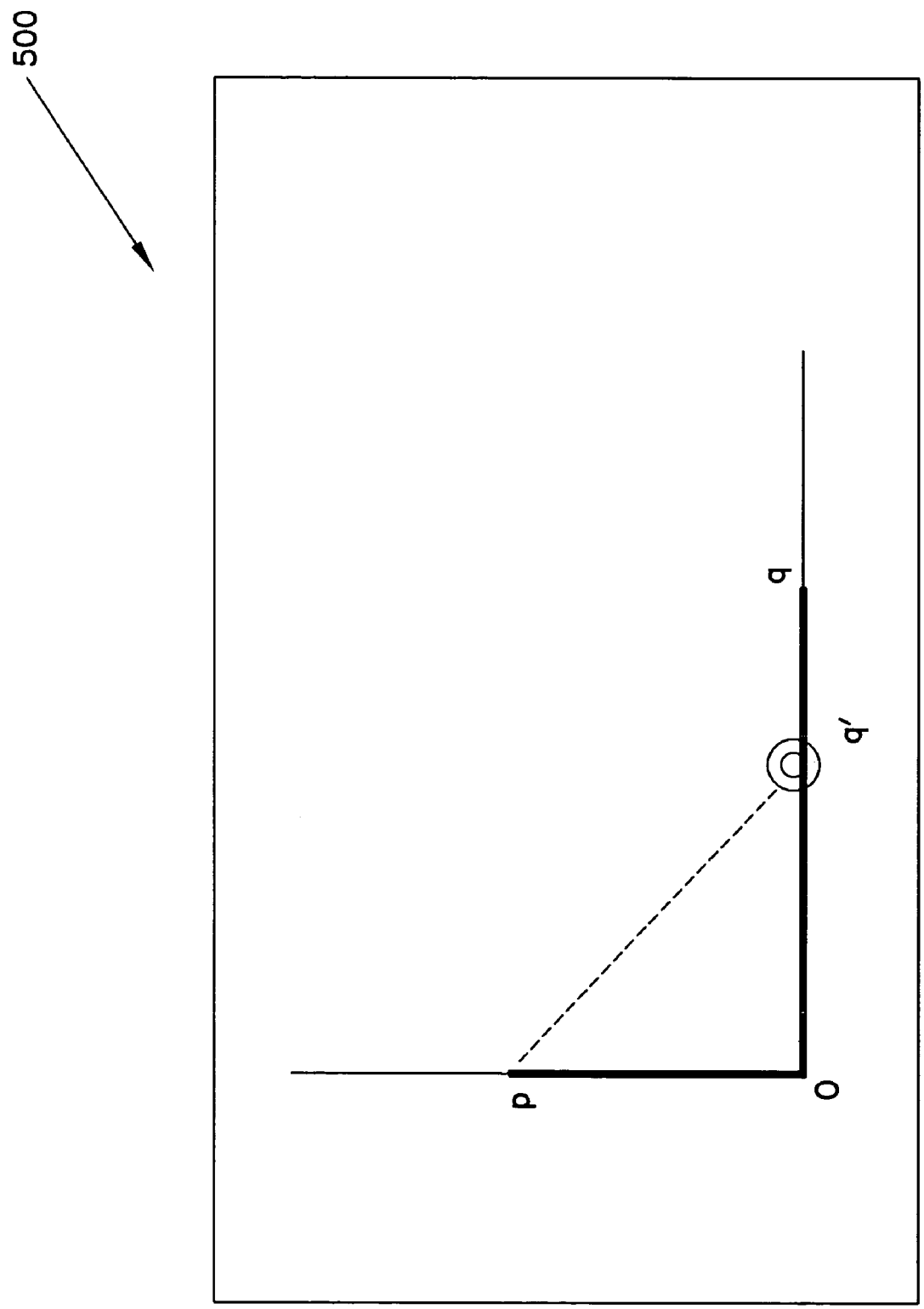
FIG. 5 illustrates a method of measuring an equal line segment.

Now referring to FIG. 5, a method of measuring an equal line segment is illustrated. Assuming p≦q, a horizontal line and a vertical line of the equal length are projected onto an image projection surface. The vertical line is projected as a line op while the horizontal line is projected as oq. One way to determine the ratio p/q is that a user moves a pointer of a pointing device to a point q' on the horizontally projected line oq to indicate a line portion oq' that has the same line length as the vertically projected line op. The coordinates of the point q' is stored in the image plate angle control unit 105 as shown in FIG. 1. The ratio K as shown in Equation (7) is thus determined by the above measurement. Using the ratio K, Equation (1) is now expressed as:

$$Z = Kqx + qy + c = q(Kx+y) + c \tag{10}$$

Since Equation (10) defines a plane whose contour lines are expressed by Kx+y=cos t, the equations for light on the image projection surface and the image plate surface are in parallel to the above contour lines. Thus, since the ratio of the inclined direction cosine with respect to the image projection surface is 1:k, the ratio with respect to the image plate is also 1:k in order to maintain the image-forming relation between the image projection surface and the image plate.

Figure 6:
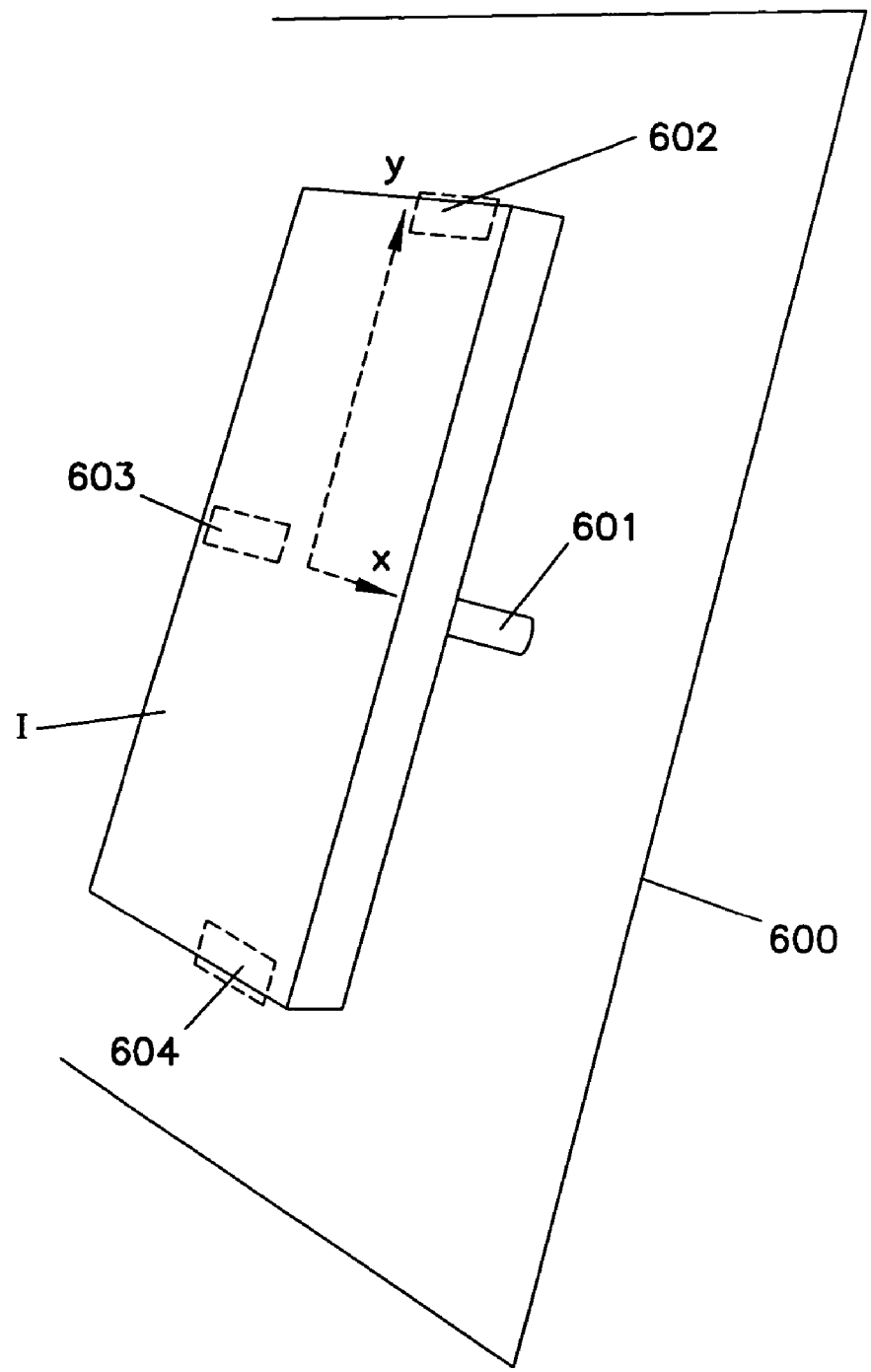
FIG. 6 is a prospective view illustrating one preferred embodiment of the image plate angle adjusting or moving unit according to the current invention.

Referring to FIG. 6, a prospective view illustrates one preferred embodiment of the image plate angle adjusting or moving unit according to the current invention. The preferred embodiment includes a set of four actuators 601, 602, 603 and 604 which are located on a base board 600. These actuators 601–604 adjustably tilt the image plate I at a desirable angle with respect to the image projection surface. There is no limitation as to the number of the actuators. The amount of the tilt or incline is expressed by:

$$1/\sqrt{K^2+1} \quad (11)$$

or $$K/\sqrt{K^2+1} \quad (12)$$

The absolute value of the inclined angle or the actual focus is adjusted by confirming an image projected on the image projection surface as it depends on the distance to the image projection surface. The absolute rotated angle is an angle formed by the image plate at I and that at I'. In comparison to the focal length of an image-forming lens, the image projection surface is generally located further and its angle is approximately zero. Consequently, the image plate angle control needs to adjust the angle only in a small amount.

Figure 7:
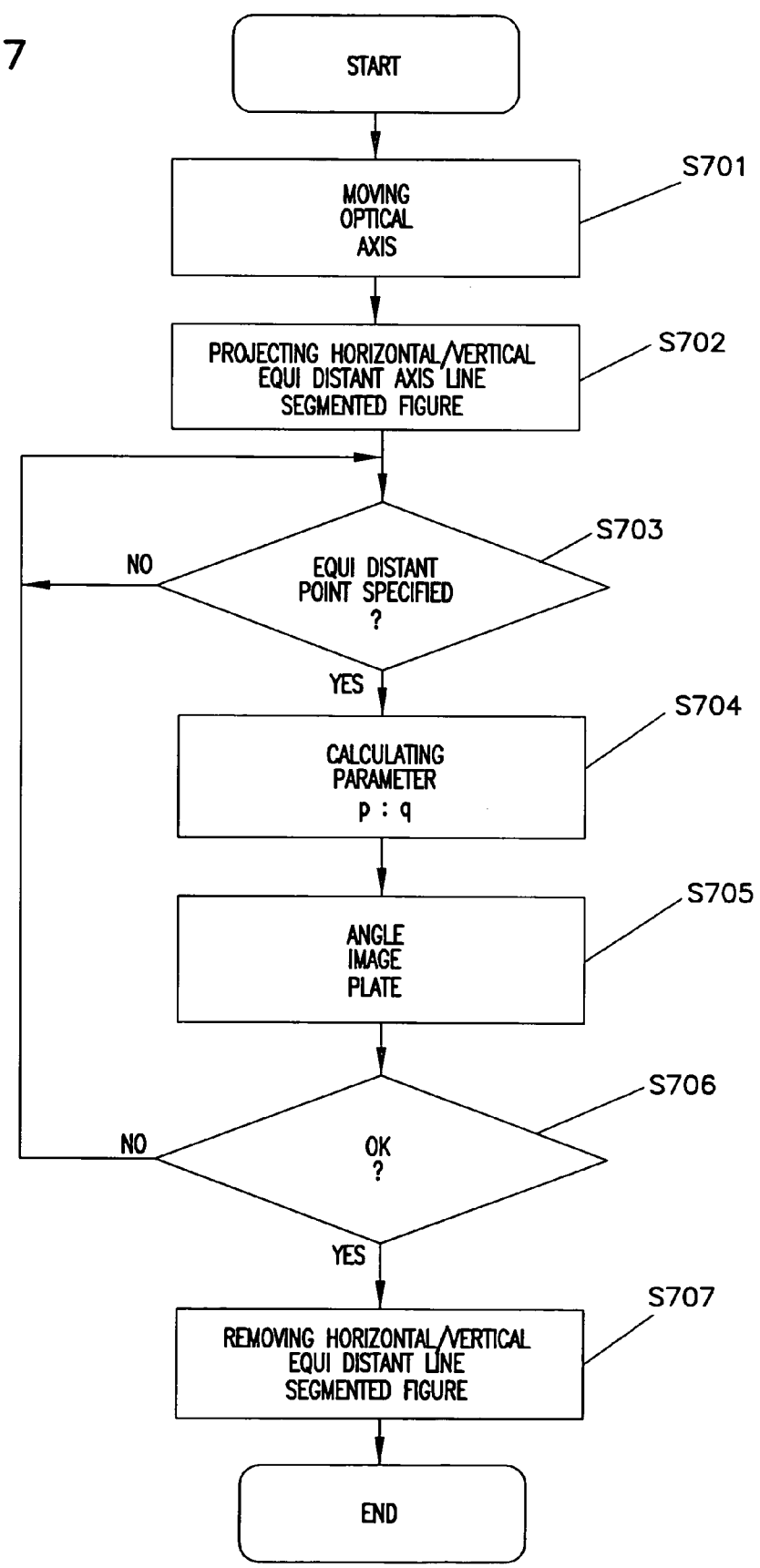
FIG. 7 is a flow chart illustrating acts involved in a preferred process of focusing the projector according to the current invention.

Now referring to FIG. 7, a flow chart illustrates acts involved in a preferred process of focusing the projector according to the current invention. In act S701, the optical axis is moved or rotated to project an image at a desired position. A predetermined horizontal line segment and a predetermined vertical line segment are projected onto a projection surface in act S702. In act S703, it is determined whether or not it has been specified a point on a longer one of the above two line segments to match the length. One way to specify the point is to use a pointing device. It is waited in the act S703 until the point is specified. When the point is specified in the act S703, the parameter p:q is calculated based upon the coordinates of the specified point in step S704. The image plate is angled based upon the calculated parameter p:q in step S705. After the image plate is angled, it is determined whether or not the image is focused on the image projection surface in step S706. If the focus is not appropriate in the act S706, the preferred process goes back to the act S703. On the other hand, if the focus is appropriate, the horizontal/vertical line segment is taken out of display in act S707. The preferred process ends.

Figure 8:
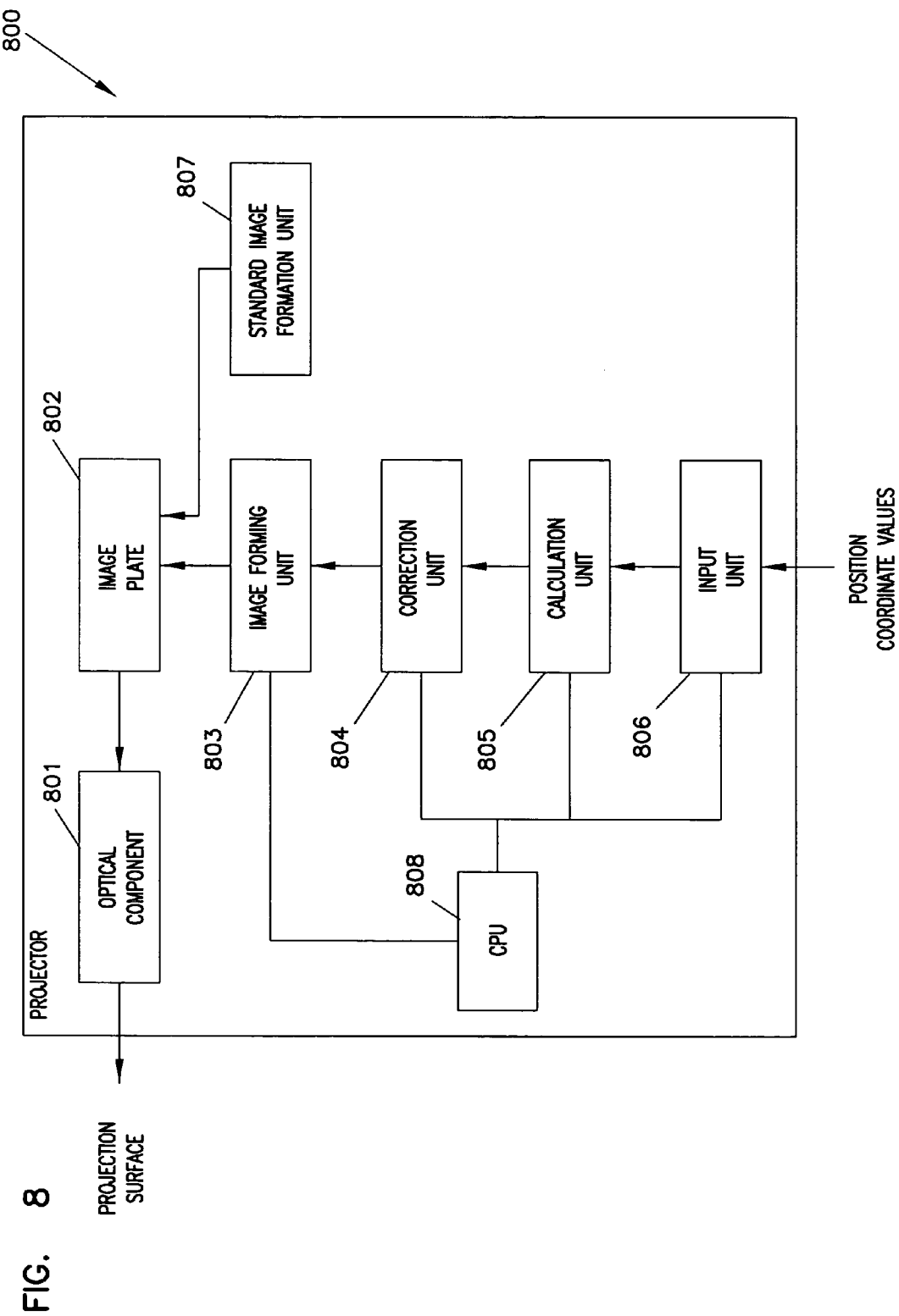
FIG. 8 is a block diagram illustrating one preferred embodiment of hardware components for digitally correcting an image in the projector according to the current invention.

Now referring to FIG. 8, a block diagram illustrates one preferred embodiment of hardware components for digitally correcting an image in the projector according to the current invention. A projector 800 includes an optical component 801 comprising a plurality of lenses, an image plate 802 such as a liquid crystal display for forming a projection image, an image forming unit 803 for forming an image for the image plate 802, a correction unit 804, a calculation unit 805, and an input unit 806 for inputting positional coordinates for correcting keystone distortion in the projected image, a standard pattern image formation unit 807 for forming a standard image and a central processing unit (CPU) 808. The CPU 808 runs a program that is stored in media such as read-only memory (ROM), random access memory (RAM), a hard disk and a floppy disk and control the image forming unit 803, the correction unit 804, the calculation unit 805 and the input unit 806. To start the correction, the standard pattern image formation unit 807 projects a predetermined standard pattern.

Figure 9:
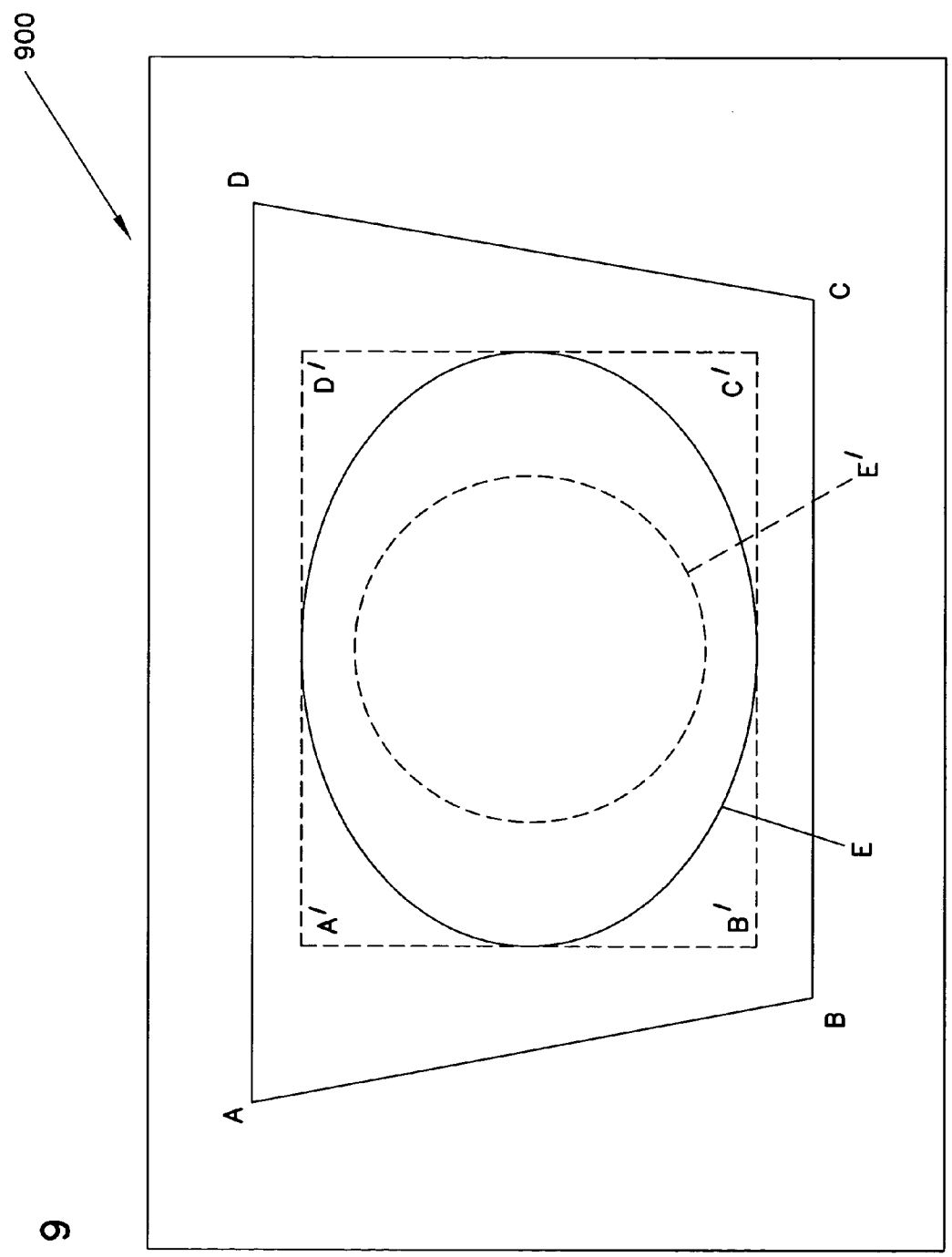
FIG. 9 illustrates an example of a standard image pattern that is corrected according to the current invention.

Now referring to FIG. 9, an example of a test image pattern is corrected according to the current invention. The exemplary standard image pattern includes a known parallelogram ABCD and a known eclipse E inside the parallelogram ABCD. If the optical axis of the projector according to the current invention were perpendicular to the image projection surface, the figures would be projected as a rectangle A'B'C'D' and a circle E' on the image projection surface as indicated by the dotted lines under ideal conditions. To use the predetermined standard image pattern, an operator of the projector points out four corners or coordinates by a pointing device or a keyboard, and these selected four positions specify the coordinates of the four corners of the ideally projected rectangle A'B'C'D'. When a keyboard is used, the coordinate values are typed in or the cursor position is moved by arrow keys. Similarly, a circle E is used to specify an amount of distortion in the projection, and the circle tends to show distortion more readily.

The relationship between the coordinates before and after the correction is expressed in the matrix equation below:

$$\begin{pmatrix} x' \\ y' \\ w' \end{pmatrix} = \begin{pmatrix} t_{11} & t_{12} & t_{13} \\ t_{21} & t_{22} & t_{23} \\ t_{31} & t_{32} & 1 \end{pmatrix} = T \cdot \begin{pmatrix} x \\ y \\ 1 \end{pmatrix} \quad (13)$$

where the coordinates before correction (x,y) and the coordinates after correction (x',y'). w' is a predetermined parameter while T is a conversion matrix. By providing the above four pairs of corner coordinates, Equation (13) is solved for the conversion matrix T. After the conversion matrix T is determined, all other points in the image are corrected based upon the same conversion matrix T to correct distortion before projecting them onto the image projection surface.

Figure 10:
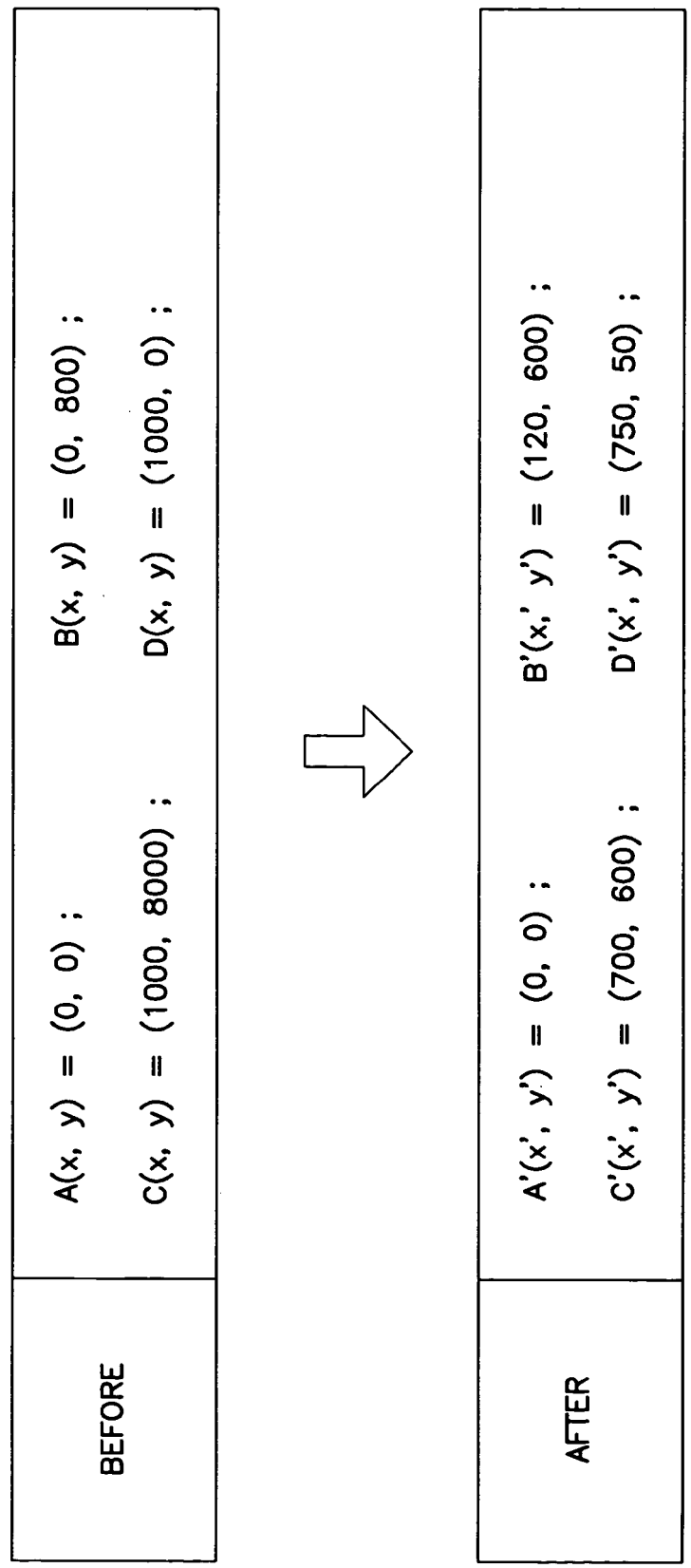
FIG. 10 illustrates an exemplary conversion using four pairs of coordinates.

Now referring to FIG. 10, an exemplary conversion is illustrated using four pairs of coordinates. Before the conversion or correction, the four pairs of coordinates A, B, C and D are respectively shown as (0, 0), (0, 800), (1000, 8000) and (1000, 0). When these four corner coordinates are specified in the above described manner, the corrected coordinates are respectively specified as (0,0), (120, 600), (700, 600) and (750, 50). Using these corresponding sets of coordinates, the conversion matrix is determined for correcting the distortion.

Figure 11:
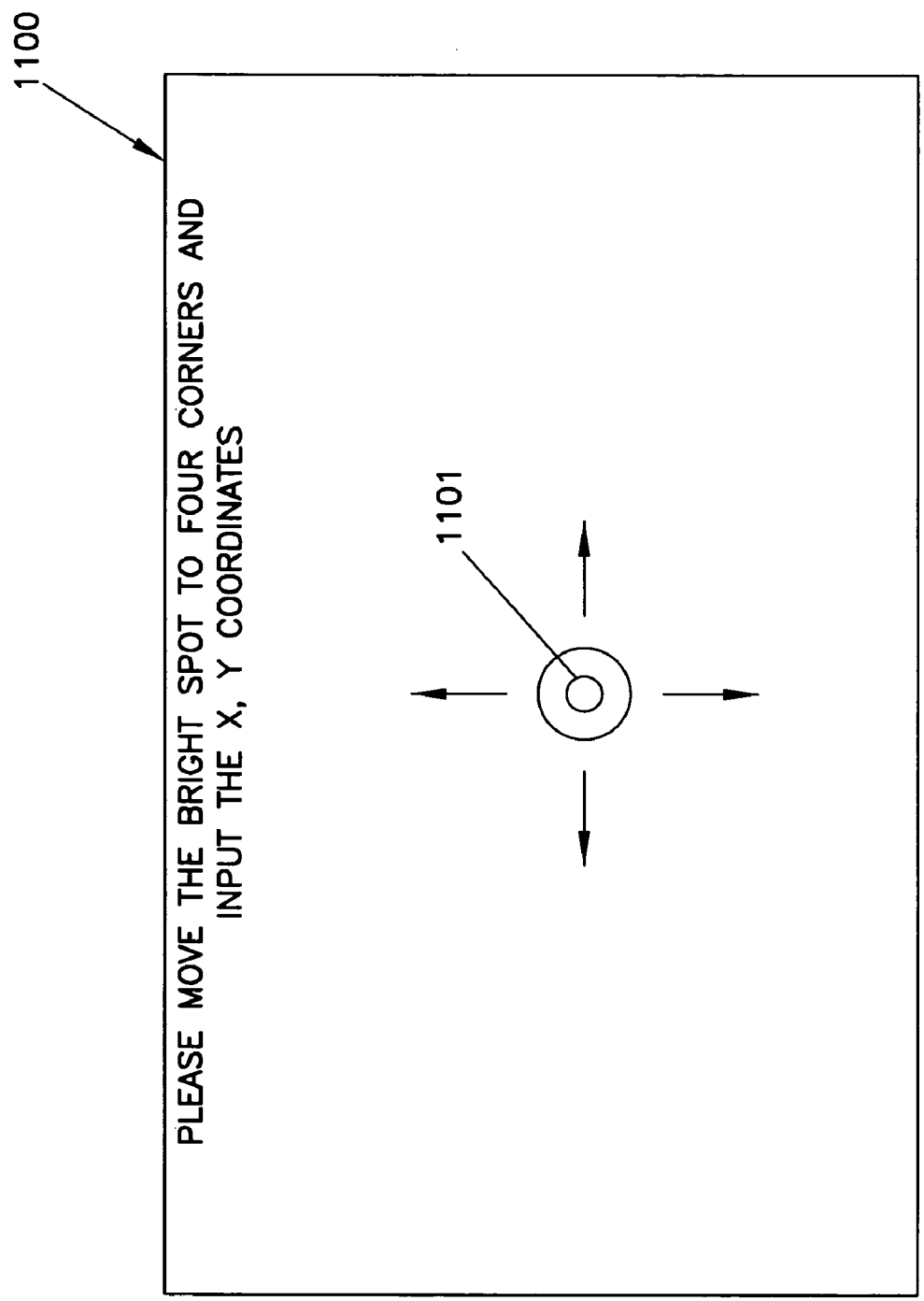
FIG. 11 illustrates an exemplary distortion correction display which includes a cursor and arrows which surround the cursor.

In an alternative embodiment, another operational method for digital correction, the projector initially displays a menu including an image size and a video input channel. An operator selects desirable conditions for the projector. In addition to the above selections, the initial menu also includes a distortion correction display. FIG. 11 illustrates an exemplary distortion correction display which includes a cursor 1101 and arrows which surround the cursor. The cursor is movable in response to a pointing device or other input devices that are connected to the projector input terminal. By moving the cursor to four desirable coordinates to specify an amount of distortion as described with respect to FIG. 9. For example, the four corner coordinates A', B', C' and D' are respectively inputted (100, 800), (100, 100), (1000, 100) and (1000, 800). As described above, the coordinate value of the cursor 1101 are alternatively inputted via a keyboard. The input process can be guided by a menu.

In any case, the numerical coordinate values have the unit of pixels. The projector keeps track of the address indicating the coordinate of the cursor 1101 in the liquid crystal display (LCD). The coordinate values of points x', y', x and y are obtained based upon Equation (13) where x' and y' are inputted by a user while x and y are determined by the projector. By the same token, four sets of two pairs of coordinates are obtained and designated as $(x'_o, y'_o)$, $(x_o, y_o)$, $(x'_1, y'_1)$, $(x_1, y_1)$, $(x'_2, y'_2)$, $(x_2, y_2)$, $(x'_3, y'_3)$, $(x_3, y_3)$. These coordinates are used in Equation (13) to solve the conversion matrix T. Since the coordinates inputted by the correction unit 803 into the image formation unit 803 are (x', y'), the x, y coordinates are determined by the following equation based upon the inverse conversion matrix $T^{-1}$:

$$\begin{pmatrix} x \\ y \\ 1 \end{pmatrix} = T^{-1} \begin{pmatrix} x' \\ y' \\ w' \end{pmatrix} \quad (14)$$

Figure 12:
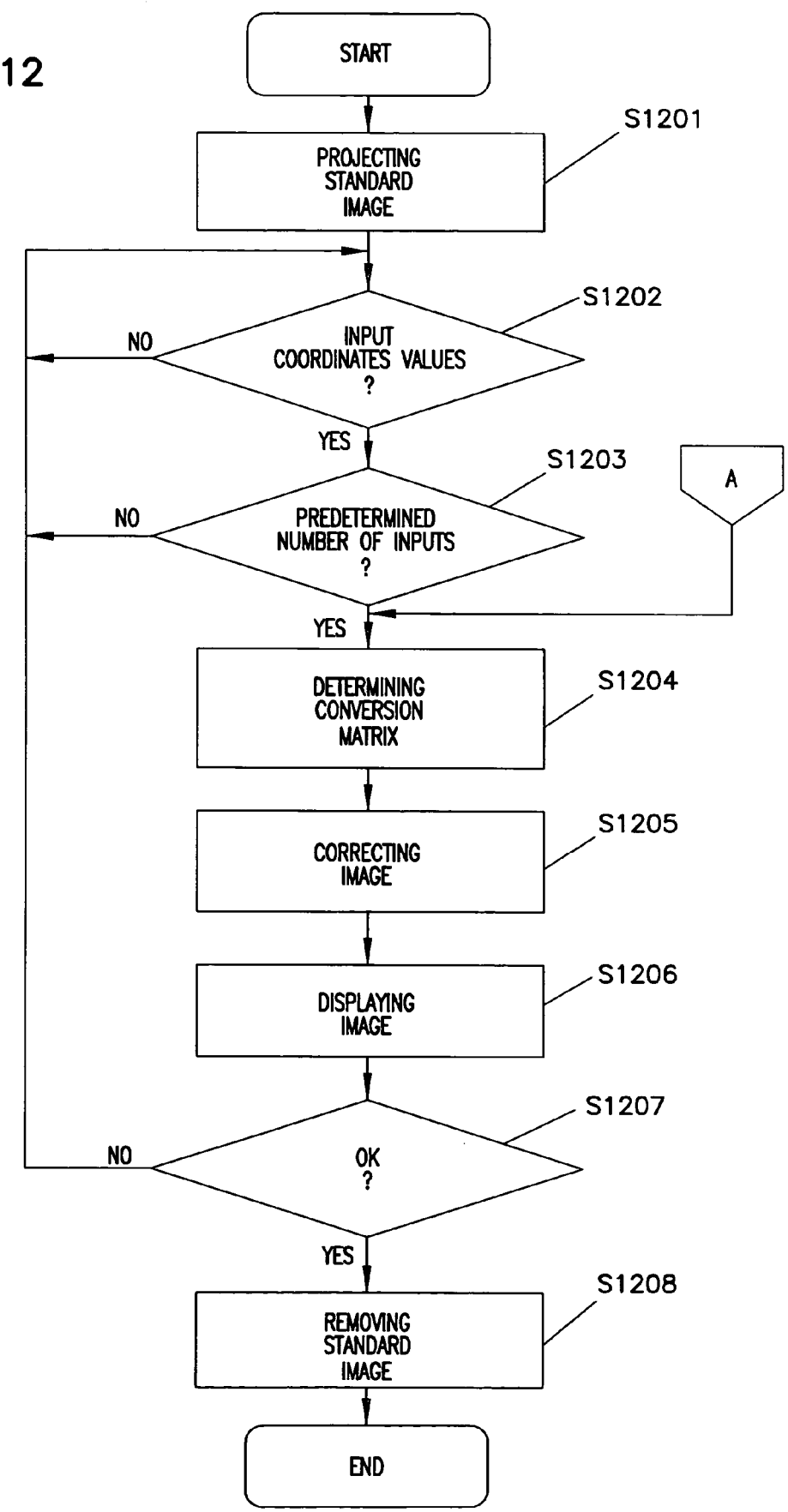
FIG. 12 is a flow chart illustrating acts involved in a preferred process of correcting distortion in a projected image according to the current invention.

Now referring to FIG. 12, a flow chart illustrates acts involved in a preferred process of correcting distortion in a projected image according to the current invention. In act S1201, a standard image pattern is projected onto an image projection surface. In act S1202, it is determined whether or not any one coordinate is inputted for a predetermined number of representative points. For example, the predetermined number is the above described four sets of two pairs of coordinates. If there is one input, it is determined whether or not the number of inputted coordinates has reached the predetermined number in act S1203. The acts 1202 and 1203 are repeated until the predetermined number of coordinates is reached. When the predetermined number of coordinates is reached, the conversion matrix is determined based upon the inputted coordinate values in act 1204. The conversion matrix represents distortion or an amount of correction. Subsequently, an image is corrected in act S1205 using the matrix determined in the act S1204. The corrected image is projected back onto the image projection surface in act S1206. It is further determined whether or not the distortion in the re-projected images is desirably corrected in act S1207. If the distortion correction is okay, the standard image pattern is removed, and the preferred process ends. On the other hand, if the desirable distortion correction is not achieved, the preferred process returns to the act S1202.

Figure 13:
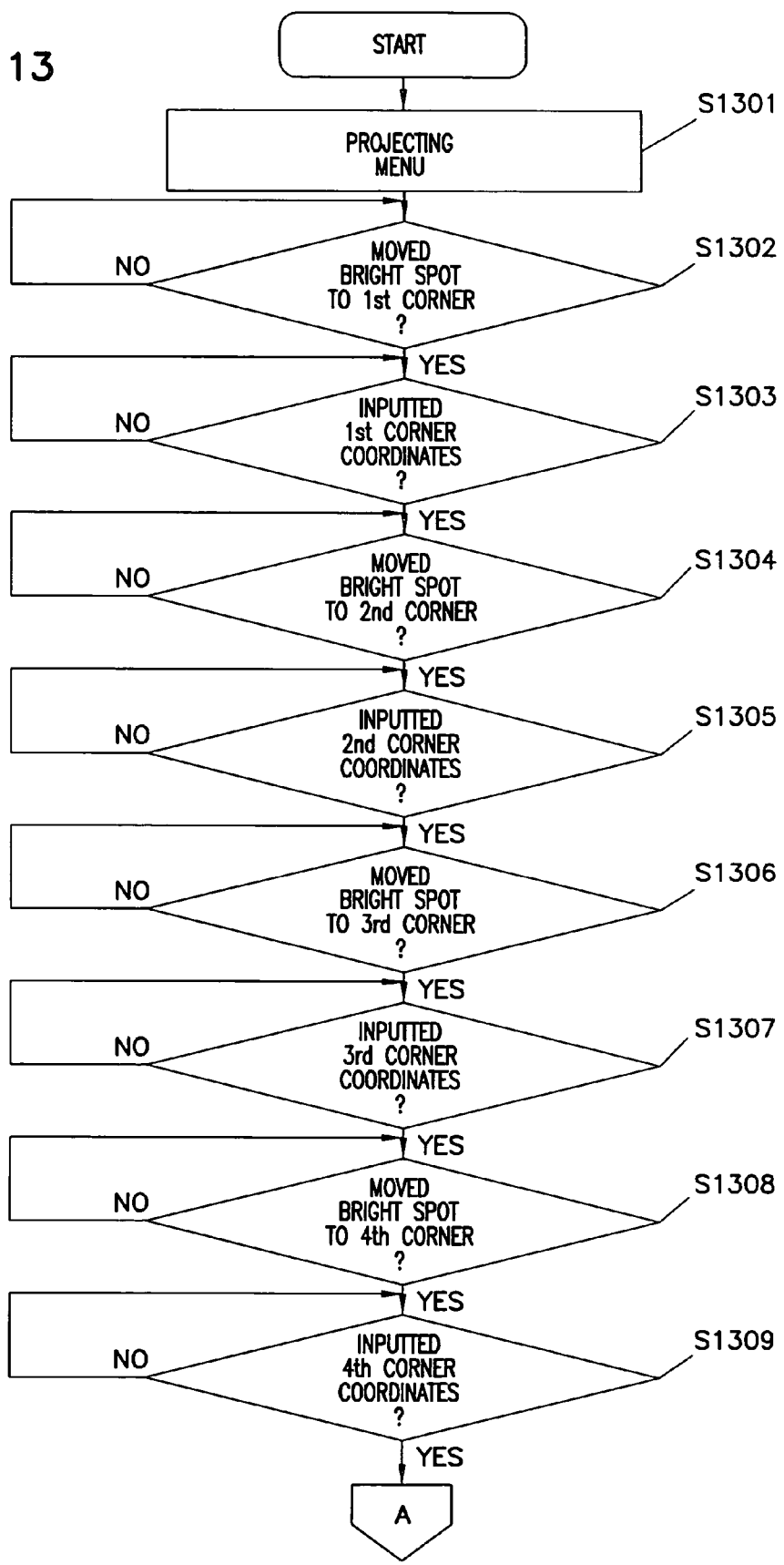
FIG. 13 is a flow chart illustrating acts involved in an alternative process of inputting coordinates for correcting distortion in an image projected by the projector according to the current invention.

Now referring to FIG. 13, a flow chart illustrates acts involved in an alternative process of inputting coordinates for correcting distortion in an image projected by the projector according to the current invention. An interactive window such as shown in FIG. 11 is displayed in act S1301. In act S1302, it is determined whether or not a cursor in the interactive window has moved to a predetermined first corner. If the cursor has moved towards the first predetermined corner, it is waited until coordinate values are inputted for the first corner in act S1303. On the other hand, if the cursor has not moved towards the first corner, the alternative process waits in the act S1302. Similarly, acts S1304 through S1309 are sequentially performed to obtain the predetermined second, third and fourth coordinates are obtained the corresponding corners. In other words, unless the sequentially determined coordinates are obtained in a predetermined order, the alternative process does not proceed to a next act. The above described alternative process is used in lieu of the acts S1202 and S1203. The above-described preferred process efficiently corrects the keystone distortion or the image projection surface based upon the user inputted coordinates.

Figure 14:
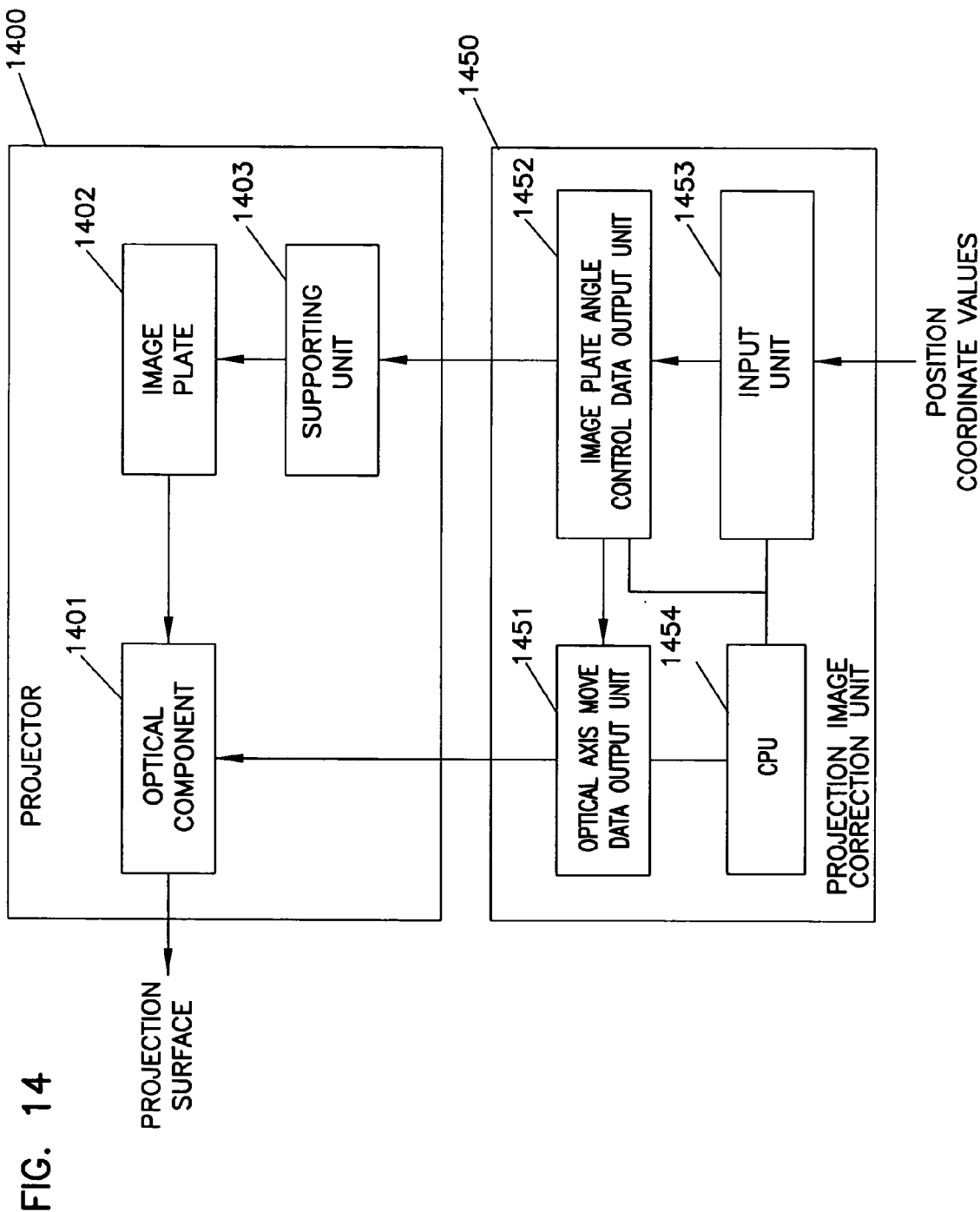
FIG. 14 is a block diagram illustrating a second preferred embodiment of the projector system according to the current invention.

Now referring to FIG. 14, a block diagram illustrates a second preferred embodiment of the projector system according to the current invention. In contrast to the first preferred embodiment as shown in FIG. 1, the second preferred embodiment separates the projector 1400 from a distortion correction unit 1450. The projector 1400 further includes an optical unit 1401 having a plurality of lenses, an image forming unit 1402 such as a liquid crystal display (LCD) and a support unit 1403 having at least two supporting points for supporting the image plate 1402. The distortion correction unit 1450 further includes an optical axis move data output unit 1451 for outputting optical axis move data specifying the movement of the optical axis towards the center of the image projection surface. Similarly, the distortion correction unit 1950 further includes an image plate angle control data output unit 1452 for outputting data to control the support unit 1403 so that the angle of the image plate 1402 is changed with respect to the image projection surface. The distortion correction unit 1450 also includes an input unit 1453 for inputting projection coordinate values to be used in focusing an image. A central processing unit (CPU) 1454 runs a predetermined program stored in storage media such as a read only memory (ROM), a random access memory (RAM), a floppy disk and/or a hand disk. The program generates signals to instruct the optical axis move data output unit 1451, the image plate angle control data output unit 1452, and the input unit. The first preferred embodiment performs the acts described in the flow chart as shown in FIG. 7. An alternative embodiment of the image correcting projector system according to the current invention has a fixed optical axis, and the distortion correction unit 1450 needs no optical axis move data output unit.

Now referring to FIG. 15, a block diagram illustrates a third preferred embodiment of the image correcting projector according to the current invention. The third embodiment includes a projector 1500 and an image correction unit 1550. The projector 1500 further includes an optical component 1501 comprised of a plurality of lenses and an image plate 1502 such as a LCD for forming an image. The projection image correction unit 1550 further includes an image forming data output unit 1551, a correction unit 1552, a calculation unit 1553, an input unit 1554 and a standard image forming data output unit 1555. Since the correction unit 1552, the calculation unit 1553 and the input unit 1554 are substantially identical to the corresponding units 804, 805 and 806 as described with respect to FIG. 8, the descriptions of these units are not repeated. The third preferred embodiment includes the standard image forming data output unit 1555 which outputs standard image data to the image forming data output unit 1551. The third preferred embodiment performs the acts described with respect to the flow chart in FIG. 12. A central processing unit (CPU) 1556 controls the above-described units 1551 through 1554 via software. The software is stored in any one of the above-described media or is down loaded via the Internet.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of projecting an image to form a projected image on an image-projection surface via an optical component, comprising the steps of:
   moving a point with respect to the projected image to a desired position on the image-projection surface at least one time to specify an area;
   converting coordinates of the projected image so as to generate a converted image to be projected in the specified area; and
   projecting the converted image onto the image-projection surface.

2. The method of projecting an image according to claim 1 wherein said point is projected onto the image-projecting surface.

3. A projector system for projecting an image, comprising:
a projection unit for projecting an image to form a projected image on an image-projection surface via an optical component;
a pointing unit for moving a point with respect to the projected image to a desired position on the image-projection surface at least one time to specify an area; and
a conversion unit communicating with said pointing unit and said projecting unit for converting coordinates of the projected image so as to generate a converted image to be projected in the specified area, wherein said projection unit projecting the converted image onto the image-projection surface.

4. The projector system according to claim 3 wherein said point is projected on the image-projection surface.

5. An information processing apparatus communicating with a projector that projects an image onto an image projection surface via an optical component, comprising:
a pointing unit for moving a point with respect to the projected image having distortion to a desired position on the image-projection surface at least one time to specify an area; and
a conversion unit communicating with said pointing unit for converting coordinates of the distorted projected image so as to project in the specified area on the image-projection surface.

6. The information processing apparatus according to claim 5 wherein said point is projected on the image-projection surface.

7. A projector for projecting an image, comprising:
a projection unit for projecting an image in a first area specified by a set of plural coordinates on an image-projection surface;
an input unit for receiving data for changing at least one of the plural coordinates on the image-projection surface to define a second area, said input unit further comprising a cursor projected onto the image-projection surface for specifying the data; and
a conversion unit operatively connected to said input unit and said projection unit for converting the plural coordinates of the projected image so as to generate a converted image to be projected in the second area, wherein said projection unit projecting the converted image onto the image-projection surface in the second area.

8. The projector for projecting an image according to claim 7 wherein the plural coordinates consist of four points.

9. The projector for projecting an image according to claim 7 wherein said conversion unit is wirelessly communicating with said input unit.

10. The projector for projecting an image according to claim 7 wherein said conversion unit is communicating with said input unit via wire.

11. An information processing apparatus communicating with a projector for projecting an image in a first area specified by a plurality of coordinates on an image-projection surface via an optical component, comprising:
an input unit for receiving data for changing at least one of the plural coordinates on the image-projection surface to define a second area, said input unit further comprising a cursor projected onto the image-projection surface for specifying the data; and
a conversion unit operatively connected to said input unit for converting the plural coordinates of the projected image so as to generate a converted image to be projected in the second area, wherein the projector projecting the converted image onto the image-projection surface in the second area.

12. The information processing apparatus according to claim 11 wherein the plural coordinates consist of four points.

13. The information processing apparatus according to claim 11 wherein said conversion unit is wirelessly communicating with said input unit.

14. The information processing apparatus according to claim 11 wherein said conversion unit is communicating with said input init via wire.

15. A method of projecting an image having four corners to form a projected image on an image-projection surface having four corners via an optical component, comprising the steps of:
selecting one corner of the projected image to correspond to one of the four corners of the image-projection surface;
converting coordinates of the projected image based upon the selected corner so as to generate a converted image to be projected;
projecting the converted image onto the image-projection surface;
moving one of the remaining three corners of the projected image to correspond to one of the three remaining corners of the image-projection surface;
converting coordinates of the projected image so as to generate a converted image to be projected;
projecting the converted image onto the image-projection surface;
moving one of the remaining two corners of the projected image to correspond to one of the two remaining corners of the image-projection surface;
converting coordinates of the projected image so as to generate a converted image to be projected;
projecting the converted image onto the image-projection surface;
moving the remaining corner of the projected image to correspond to the remaining corner of the image-projection surface;
converting coordinates of the projected image so as to generate a converted image to be projected; and
projecting the converted image onto the image-projection surface.

16. A projector for projecting an image having four corners to form a projected image on an image-projection surface having four corners via an optical component, comprising:
an input unit for selecting one corner of the projected image to correspond to one of the four corners of the image-projection surface;
a conversion unit connected to said input unit for converting coordinates of the projected image based upon the selected corner so as to generate a converted image to be projected; and
a projection unit connected to said conversion unit for projecting the converted image onto the image-projection surface, wherein said input unit also allows the user to move one of the remaining three corners of the projected image at a time to correspond to one of the three remaining corners of the image-projection surface and said projection unit subsequently projects the converted image onto the image-projection surface after each conversion.

* * * * *